United States Patent
Fox et al.

(10) Patent No.: US 6,260,047 B1
(45) Date of Patent: Jul. 10, 2001

(54) INVENTORY MANAGEMENT SYSTEM

(75) Inventors: Billy Shane Fox, Dallas; Fred Mueller, Argyle, both of TX (US)

(73) Assignee: Maxagrid International, Inc., Addison, TX (US)

(*) Notice: Subject to any disclaimer, the term of this patent is extended or adjusted under 35 U.S.C. 154(b) by 0 days.

(21) Appl. No.: 09/143,586

(22) Filed: Aug. 31, 1998

Related U.S. Application Data

(63) Continuation-in-part of application No. 09/110,990, filed on Jul. 7, 1998.
(60) Provisional application No. 60/070,363, filed on Jan. 2, 1998.

(51) Int. Cl.$^7$ .................................................. G06F 17/30
(52) U.S. Cl. ................................ 707/104; 707/4; 707/5; 707/6; 707/103; 707/501; 705/8; 705/10; 705/26; 705/28; 700/106
(58) Field of Search ................................ 705/26–28, 1, 705/5, 8, 10, 14–15; 700/106; 707/2, 3, 4, 10, 100, 5, 6, 104, 501, 513, 103

(56) References Cited

U.S. PATENT DOCUMENTS

| | | | |
|---|---|---|---|
| 4,700,295 | * | 10/1987 | Katsof et al. ........................... 705/28 |
| 5,241,467 | * | 8/1993 | Failing et al. .......................... 705/28 |
| 5,383,112 | * | 1/1995 | Clark ...................................... 705/28 |
| 5,594,899 | * | 1/1997 | Knudsen et al. ......................... 707/2 |
| 5,615,109 | * | 3/1997 | Eder ........................................ 705/8 |
| 5,712,989 | * | 1/1998 | Johnson et al. ........................ 705/28 |
| 5,758,328 | * | 5/1998 | Giovannoli ............................. 705/26 |
| 5,761,432 | * | 6/1998 | Bergholm et al. .................... 709/226 |
| 5,771,172 | * | 6/1998 | Yamamato et al. .................... 705/28 |
| 5,854,746 | * | 12/1998 | Yamamato et al. .................. 700/106 |
| 5,870,733 | * | 2/1999 | Bass et al. ............................... 705/2 |
| 5,897,622 | * | 4/1999 | Blinn et al. ............................ 705/26 |
| 5,933,822 | * | 8/1999 | Braden-Harder et al. ............... 707/5 |
| 6,061,691 | * | 5/2000 | Fox ....................................... 707/104 |

OTHER PUBLICATIONS

Bastian, Jeffrey et al, "Forecasting Energy Prices in a Competitive Market", IEEE Computer Applications in Power, vol.: 12, Issue: 3, Jul. 1999, pp. 40–45.*
Feng, Gao et al., "Forecasting Power Market Clearing Price Using Neural Network", Proceedings of the 3rd World Congress on Intelligent Control and Automation, Jun. 28–Jul. 2, 2000, pp. 1098–1102, vol. 2.*
Tetzlaff, Ulrich A. W. et al., "Optimal Workload Allocation Between a Job Shop and an FMS", IEEE Transactions on Robotics and Automation, vol.: 15, Issue: Feb. 1, 1999, pp. 20–32.*
Pricing & Rate Forecasting Using Broadcast Yield Management, National Association of Broadcasters, 1992 Maxagrid Home Services, Web Page.

* cited by examiner

Primary Examiner—Kim Vu
Assistant Examiner—Shahid Alam
(74) Attorney, Agent, or Firm—Philip G. Meyers; Philip G. Meyers Intellectual Property Law, P.C.

(57) ABSTRACT

A method for selecting an optimum time period from an inventory of available time periods, where each time period has a predetermined duration including selected and unselected time portions and an associated cost includes determining the total amount of time in each time period and the total amount of unselected time in each time period. A calculation is made for each time period to generate an inventory utilization index ratio based upon the total amount of time in each time period divided by the total amount of unselected time remaining in each time period. A table is prepared for all time periods in the inventory ranked numerically by the inventory utilization index ratio. A cost range is determined for each of the costs associated with each of the time periods. The table of time periods in the inventory is revised by removing time periods from the inventory which are not within the desired cost range. A time period is selected from the table based upon the ranking of the time period. Information related to the selected time period is stored as containing selected time in the time period inventory.

16 Claims, 2 Drawing Sheets

INVENTORY MANAGEMENT SYSTEM

This application is a continuation-in-part of U.S. Ser. No. 09/110,990, filed Jul. 7, 1998, which was a conversion from and claims priority of U.S. Provisional Application Ser. No. 60/070,363, filed Jan. 2, 1998.

TECHNICAL FIELD

The present invention relates to management of broadcast commercial inventory, and more particularly to a system and method for optimizing the sale value of remaining broadcast commercial inventory available for sale to advertisers.

BACKGROUND OF THE INVENTION

Media properties include broadcast stations such as television and radio stations and other media such as cable television systems. The process by which media properties provide a rate quote to an advertiser for commercial inventory, which inventory is expressed in a units currency measured in seconds, is much different from the process used by other industries. This difference is due almost exclusively to the type and quality of information pertaining to the value of available inventory, at a particular moment in time, relative to other available inventory. Clearly, the same unit of inventory has a much different value depending upon when the inventory is required by a customer, and from a broadcast station's perspective, the likelihood that the particular unit of inventory can be sold at a later date for at least as much revenue, relative to all other remaining units for sale, and the likelihood that those units will be sold at a later date by the broadcast station.

At any particular moment, there are various quantities of inventory available by program and time segment for future sale. At the moment that a specific customer requests prices and whether inventory is available, it is important that inventory optimization take place from the station's perspective. However, the broadcast industry has, to a great extent, been confused as to the meaning of optimization. The term optimization has been used almost exclusively to define parameters from the buyer's perspective, and not the broadcast station. Usually, the buyer will instruct the station to "take my budget and make it go as far as you can, given the parameters I give you." The remaining time inventory and its significance to the station has not been considered, because there has been no meaningful approach to provide inventory information from the broadcast station's perspective to its sales personnel.

A need has thus arisen for a process to provide information to broadcast station personnel as to the real value of remaining commercial units with respect to each other, at a particular moment in time, given the probability of sale relative to total time period availabilities. There is also a need for an inventory optimization process to determine available inventory at a particular moment in time. Such a process must provide an opportunity for broadcast station personnel to know instantly which broadcast program, days and time segments are necessary to meet a customer's request based upon the needs of the station in terms of inventory utilization. Such a process must identify the value of remaining inventory at the time of the availability request, as the inventory relates to total original capacity for each program or time segment available for sale at a designated cost efficiency parameter.

SUMMARY OF THE INVENTION

In accordance with the present invention, a method is provided for selecting a time period from an inventory of all available time periods, where each time period has a predetermined total capacity including selected and unselected time portions and an associated cost for each time period. The method includes determining the total amount of time in each time period and the total amount of unselected time in each time period, or an equivalent quantity. A calculation is made for each time period to generate an inventory utilization index (IUI) ratio based upon the total amount of time in each time period divided by the total amount of unselected time remaining in each time period. A cost range or limit is chosen for the desired time periods, and a table is prepared for time periods in the inventory within the cost range or limit ranked numerically by the inventory utilization index ratio. Such a table may be prepared by first creating a table of all time periods in the inventory ranked numerically by the inventory utilization index ratio and then revising the table by removing time periods from the inventory which are not within the desired cost range. In the alternative, the time periods may be limited to those matching the cost or other customer criteria before the ranked table is created. A time period is selected from the table based upon the ranking of the time period. Other criteria being equal, the chosen time period will preferably be the one with the lowest IUI ratio. The selected time periods are stored as containing additional selected time in the time period inventory.

The method described above may include maintaining the time period inventory as a machine-readable computer file on a storage medium and repeating the foregoing steps each time a request for time is received. The time periods may correspond to advertising time associated with media property programming. The step of selecting one or more time periods from the table may involve simply selecting a time period with the lowest IUI ratio, or selecting a time period with the lowest IUI ratio that satisfies one or more additional criteria for the time period. The step of preparing a table of time periods ranked numerically by IUI ratio may comprise ranking the time periods from lowest to highest and ranking time periods having equal inventory utilization index ratios in order of greatest remaining capacity.

According to a further aspect of the invention, a method is presented for selecting a time period corresponding to advertising time associated with media property programming from an inventory of available time periods. Each time period has a predetermined total capacity, including selected and unselected time portions, and an associated cost. The steps of this method include determining a total amount of time in each time period, a total amount of unselected time within the unselected time portions of each time period, and a cost range or limit applicable to the time periods. An IUI ratio is calculated for each time period in the inventory based upon the total amount of time in each time period divided by the total amount of unselected time portions remaining in each time period. A table of time periods for time periods in the inventory is generated, ranked numerically by the inventory utilization index ratio for each time period and including only time periods within the selected cost range or limit. One or more time periods remaining in the table are selected such that, other criteria being equal, a time period with the lowest IUI is selected, and the selected time period is stored as containing additional selected time in the time period inventory. The IUI ratios may be calculated for a single station or media property or for a group of stations, such as all of the stations owned by a common business enterprise (e.g., a parent company), or a subgroup of stations owned by a common enterprise.

In accordance with another aspect of the invention, a system is provided for selecting a time period from an inventory of available time periods, where each time period has a predetermined duration, including selected and unselected time portions and an associated cost. Such a system may comprise a computer with conventional peripheral devices including a data storage medium for storing a database containing a total amount of time in each time period and a total amount of unselected time within the unselected time portions of each time period, as well as related information such as the identity of the purchaser.

BRIEF DESCRIPTION OF THE DRAWINGS

For a more complete understanding of the invention and for further advantages thereof, reference is now made to the following description of preferred embodiments taken in conjunction with the accompanying drawings, in which.

DESCRIPTION OF THE PREFERRED EMBODIMENTS

The present method optimizes remaining commercial inventory available for sale to an advertiser, thus improving overall broadcast station's revenues. It calculates and uses an index which ranks and optimizes the selection of commercial programs or time periods for a broadcast property, such as, for example, television, radio or a cable system. The ranking is based upon remaining availability of commercial inventory given original capacity, and upon a user-defined parameter of prevailing rate, cost per thousand, or cost per point of the specific broadcast program or time period. The invention enables sales personnel to know, learn, access, then optimize those programs available for sale to an advertiser while developing an advertising campaign on behalf of the customer that meets the customer's needs. An important aspect of the invention is the ability to determine the remaining commercial availability as it relates to original total capacity of a program or a time period for sale at an advertiser's defined cost parameter. As used herein, the term "time period" will refer to a commercial unit or minutes available for sale associated with a program, such as, for example, a television program. For TV, a sample time period would be Thursday night 8:00 PM to 8:30 PM, Program Name Seinfeld. For radio, a typical time period would be Monday through Friday, 6 AM–10 AM, called Morning Drive. On cable, CNN has a time period from 5:00 PM to 6:00 PM named World News Today.

Figure 1:
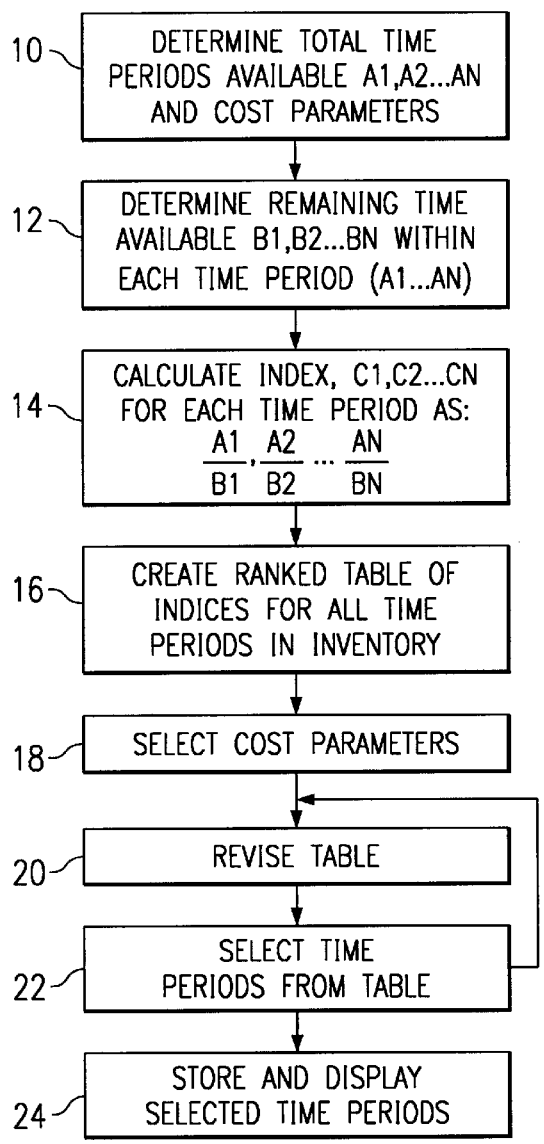
FIG. 1 is a schematic block diagram illustrating the present method.

Referring to FIG. 1, at step 10 a determination is made as to the total number of time periods available for sale for each program or time period A1, A2, . . . AN. A1 is the total number of commercial units or minutes available for sale for a program or time period broadcast 1, and AN is the last program or time period available for sale. Associated with each time period are cost parameters established by the station.

At step 12, a determination is made as to the remaining time available, B1, B2 . . . BN within each time period (A1 . . . AN). This determination is made for the remaining commercial units or minutes available for sale by program or time period at any particular moment in time. B1 is the remaining commercial units or minutes within the time period by program or time period 1. BN is the remaining commercial units or minutes for sale by program or time for the last program or time period available for sale.

At step 14, an inventory utilization index (IUI) in accordance with the invention is calculated for each time period. The index C1, C2 . . . CN represents a ratio A/B between the total number of commercial units or minutes available for sale by program or time period (A) and the remaining commercial units or minutes for sale by program or time period (B). C1 represents the index for time period 1, and CN represents the index for the last program or time period available for sale.

At step 16, the indices C1 . . . CN are ranked, such as, for example, from the minimum value of C to the highest value of C, where the minimum value of C represents a more desirable program for time availability, i.e., the optimum time period or program. In the table of step 16, in the event IUI ratios for two or more time periods are tied, the time periods are ranked in order of greatest remaining capacity, that is, the time period having the greatest value of A is ranked highest. As a third tier criterion, in the event both C and A are the same, the indices may be ranked in order of cost, with the program having the highest (or lowest) cost ranked highest.

If a time period has no time remaining, meaning that the value of B is zero, the time period A is moved to the bottom of the table. A time period having no available time is still maintained in the table because the station may overbook certain time periods, and a particular customer may still desire to select such a time period. If the value of C is 1, meaning that no time for the particular time period has been sold, the rank of this time period will be at the top of the table.

For TV prime shows (those programs which run between the local news broadcasts, usually after 7:00 PM but before 10:00 PM U.S. Central Time), 3 to 4 total commercial minutes are available, which translate to 6 to 8 commercial units. For radio, most stations will run between 8 to 12 minutes/units per hour, so for a day period like Morning Drive (6 AM–10 AM), 32 to 48 total minutes would be available. If the day period is measured for 5 days, e.g., Monday through Friday, then 160–250 total minutes or units would be the total. Cable television usually has 4 to 8 local insertion minutes per hour.

When almost all time for a program or time period A has been sold, C usually approaches a value in the range of about 30 to 60. This reflects the ratio (A/D) between the total number of commercial units or minutes available for sale by program or time period (A) and the smallest salable unit or slot (D) of time within that time period. Thus, where A is 10 minutes and the smallest salable time increment or time slot (D) is 10 seconds or 0.17 minute, the ratio (A/D) is 59. At step 18, customer-specified cost parameters are selected. These parameters may be determined based upon the prevailing rate of the particular broadcast program, the rate per thousand viewers or radio listeners, or cost per rating point of the television or radio program. These costs may be associated with each time period A at step 10, or after the table of step 16 is created. Cost parameters can also be determined utilizing the Maxagrid™ software created by Maxagrid International, Inc. of Dallas, Tex. for forecasting rates for future programming. The results of these forecasts can be utilized for the selection of cost parameters at step 18.

At step 20, the table of indices for all time periods generated at step 16 is revised based upon the cost parameters selected at step 18. The programs associated with time periods within the table and not consistent with the cost parameters of the customer are removed from the table. Typically, the table is updated to include only those programs within a predetermined range, such as plus or minus 10%, of the cost per point or the rate requested by the customer.

At step 22, time periods are then selected from the table having the lowest IUI ratio within the desired cost range or upper limit. Other criteria may be applied, either by the user or as part of a software program written to implement the method. For example, a user may desire to further limit the table to time periods associated with a particular program type, such as news or sports. In such a case, the software references a predetermined, stored program type parameter for each program or time period and limits table entries to the specified program type or types. If the customer has expressed a desire for a specified mix of program types, the user can search the list manually to find programs that correspond to the customer's choice and make selections on the screen, or the software can regenerate the table several times in succession, applying a different program type parameter each time using the same or different cost range parameter. Further additional parameters may be referenced so that entries in the list are limited even more specifically, for example, by day of the week. The method of the invention could, for example, display a table of programs in IUI order within a specified cost range, for news programs only, and for programs on Sundays only.

When a time period is selected, the IUI ratio for that time period is recalculated by subtracting the amount of time in the selected time slot(s) from the remaining time available (B). The program may optionally track availability of individual time slots within each time period, or these may remain unspecified. In the former case, one or more time slots within the selected time period may be designated as unavailable. The data relating to the sale, including the identity of the purchaser, the time period selected and the amount of time selected, are saved to the database for eventual export to a traffic billing system that invoices the customer for the advertising time purchase and keeps corresponding accounting records. At step 24, all of the foregoing data is stored on a storage medium, such as a magnetic disk, and displayed to station personnel on a screen for confirmation.

Figure 2:
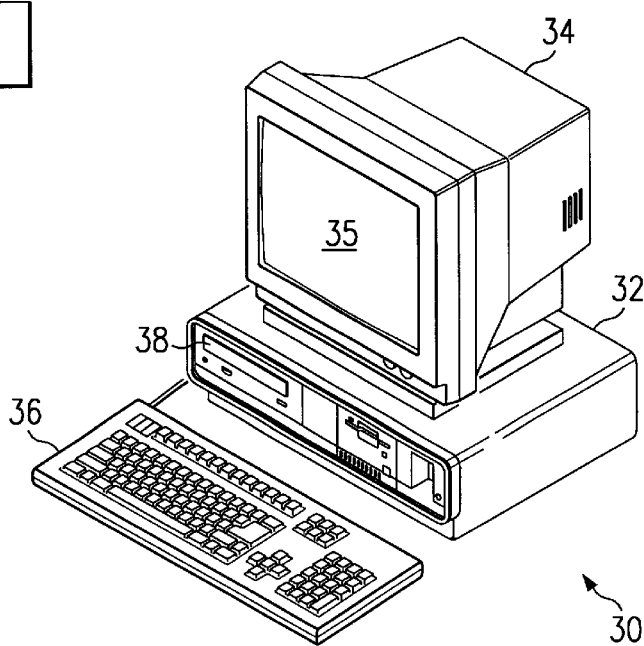
FIG. 2 is a diagram of a hardware system illustrating the invention.

FIG. 2 illustrates a system 30 in accordance with the invention. System 30 for carrying out the method previously described includes a computer 32 having a processor for performing the calculations of computational steps and memory for loading software to carry out and store the results of each step. A display device 34 such as a monitor or printer is used to display the time period table 35 to the user. An input device 36 such as a keyboard permits entry of user selections, particularly for selecting time periods from the table. A permanent, read-write storage medium such as a hard drive 38 stores the database of available time slots between sessions. In this manner, the database of time slots may be intermittently updated as requests for advertising are received from customers, and each successive request is optimized based on the time left available from all previous requests. Cost per time period is preferably updated periodically or after each transaction using the cost parameter software. The invention thus optimizes remaining commercial inventory available for sale to a customer, thus improving overall media property station revenues.

Figure 3:
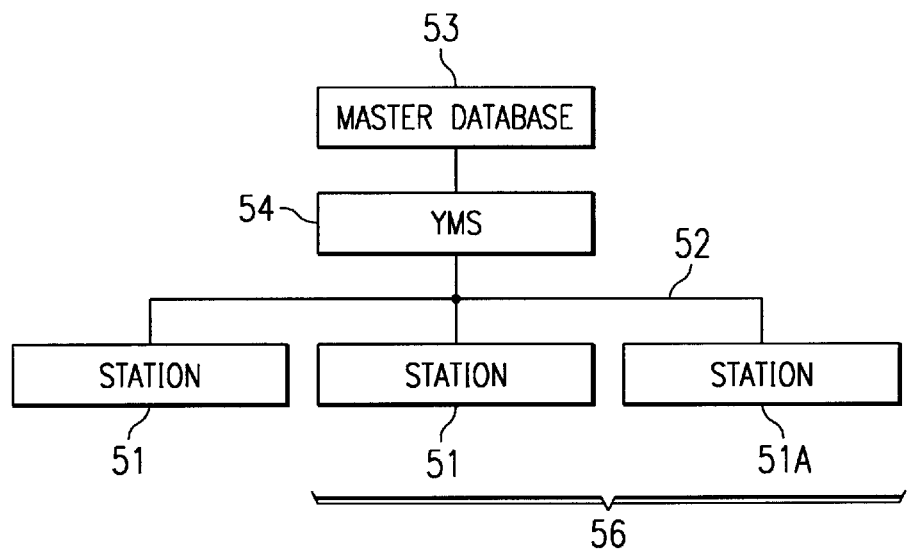
FIG. 3 is a schematic block diagram of a first embodiment of a multi-station system according to the invention.

Referring to FIG. 3, according to a further aspect of the invention, the IUI rankings from the table may be generated for multiple stations forming part of a single enterprise. This can be managed, for example, by providing each station 51 with access to a network 52 such as the Internet, a local area network or a wide area network that maintains a master database 53 of time sales data for all member stations. A single, multi-station yield management system 54 may, for example, permit selection by an individual station 51A, stations within one or more predetermined markets or geographic regions defined by a subgroup 56 of stations 51, or all stations 51 within the enterprise.

The following is a sample IUI table for a multi-station enterprise:

| Station/Daypart | IUI Rank |
| --- | --- |
| KAAA-FM 10a–3p M–F | 1 |
| KAAA-FM 6a–10a Sat | 2 |
| KBBB-FM 6a–10a M–F | 3 |
| KCCC-FM 3p–8p M–F | 4 |
| KBBB-FM 10a–3p M–F | 5 |
| KDDD-FM 3p–8p M–F | 6 |
| KBBB-FM 10a–3p Sat | 7 |
| KCCC-FM 10a–3p Sun | 8 |
| KDDD-FM 6a–10a M–F | 9 |
| KAAA-FM 10a–9p Sun | 10 |

In this embodiment, the table includes identification of both the time slot and the originating station, ranked competitively by IUI, and the column for IUI rank lists the selected slots in ranked order, as shown, or by actual IUI. The table may further select for stations of a particular type or media format within the enterprise, such as news stations, country and western stations, religious stations, or the like.

Figure 4:
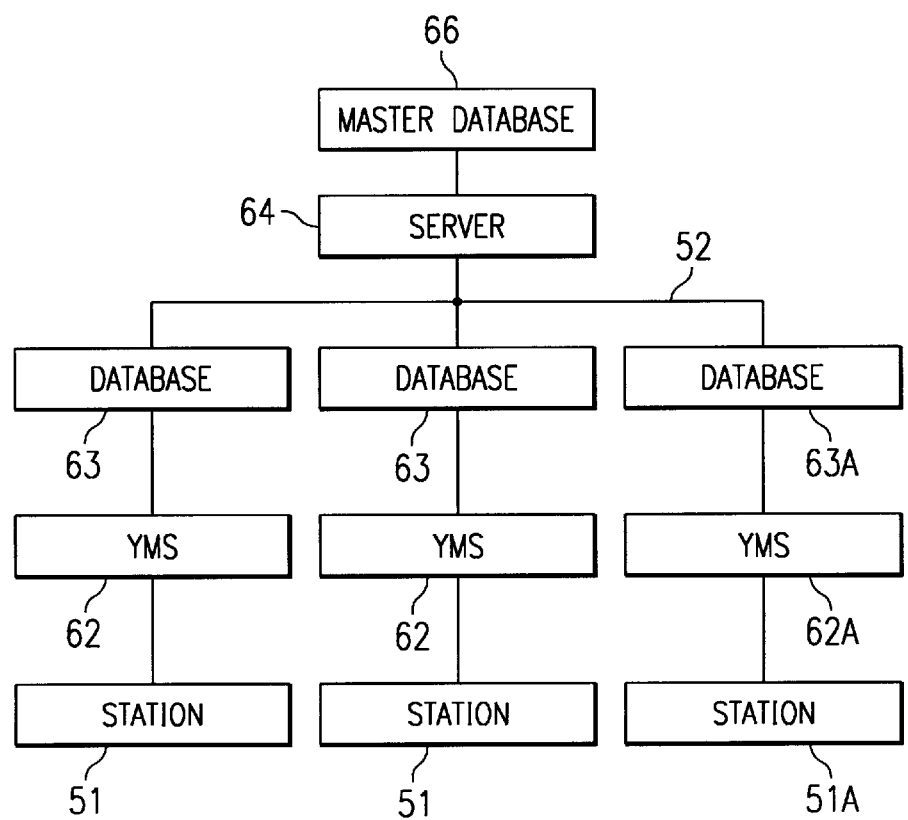
FIG. 4 is a schematic block diagram of a second embodiment of a multi-station system according to the invention.

Referring to FIG. 4, a multi-station system may also be structured as a number of stand alone yield management systems 62 and databases 63, one for each station 51, which communicate with a central server 64 through a network 52 to maintain a master database 66. Master database 66 mirrors the contents of each of the individual databases 63 and is updated either periodically or whenever a database 63 is updated. When a request for time is received at station 51 A that requires access to time data from other stations 51, system 62A receives this data from database 66 through network 52. In the event of network failure, stand alone yield management systems 62 can continue functioning to sell time for each respective station 51. Real time updating of master database 66 is desirable to prevent potential errors due to a time lag between a change in a local database 63A indicating a sale and updating of master database 66, which will be accessed by other yield management systems 62 seeking to list, and possibly sell, a time slot of a station 51A which corresponds to database 63A.

Whereas the invention has been described with respect to specific embodiments thereof, it will be understood that various changes and modifications will be suggested to one skilled in the art and it is intended to encompass such changes and modifications as fall within the scope of the appended claims. For example, alternative computational methods for reaching the end results described above are equivalents within the scope of the invention. The invention is not limited to time management and may be applied to other types of inventories with similar characteristics, for example, workload management wherein it is desired to assign a new project of a given size or duration to one of several individuals or groups having varying capacity, or advertising space in newspapers. Similarly, the multi-station systems according to the invention may create reports or tables using criteria other than the IUI ratio. These and other alternatives are within the scope of the claims which follow.

What is claimed is:

1. A computer-implemented method for selecting one or more of an inventory of available time periods, each time period or portion thereof having a cost associated therewith, comprising the steps of:

(a) determining a total amount of time in each time period;
   (b) determining a total amount of unselected time remaining in each time period;
   (c) calculating an inventory utilization index ratio for each time period as the total amount of time in each time period divided by total amount of unselected time remaining in each time period;
   (d) preparing a table of time periods ranked numerically by the inventory utilization index ratios;
   (e) determining a cost range or limit applicable to the time periods;
   (f) limiting the table to time periods which are within the specified cost range or limit;
   (g) selecting one or more time periods from the table; and
   (h) storing the selected time periods as containing additional selected time in the time period inventory.

2. The method of claim 1, wherein step (h) comprises maintaining the time period inventory as a machine-readable computer file on a storage medium.

3. The method of claim 2, further comprising repeating steps (a) to (h) each time a request for time is received.

4. The method of claim 3, wherein the time periods correspond to advertising time associated with media property programming.

5. The method of claim 4, wherein step (g) further comprises selecting a time period with the lowest inventory utilization index ratio.

6. The method of claim 5, wherein the table includes an identifier of the media property offering each ranked time period, and time and date information for each ranked time period.

7. The method of claim 6, wherein the table comprises a computer-generated video display.

8. The method of claim 4, wherein the time periods correspond to advertising time associated with a single media property.

9. The method of claim 4, wherein the time periods correspond to advertising time associated with multiple media properties forming part of a common enterprise.

10. The method of claim 1, wherein step (g) further comprises selecting a time period with the lowest inventory utilization index ratio and which satisfies one or more additional criteria for the time period.

11. The method of claim 1, wherein step (d) further comprises ranking the time periods from lowest to highest.

12. The method of claim 7, wherein step (d) further comprises ranking time periods having equal inventory utilization index ratios in order of greatest remaining capacity.

13. A computer-implemented method for selecting a time period corresponding to advertising time associated with media property programming from an inventory of available time periods, where each time period has a predetermined total capacity, including selected and unselected time portions, and an associated cost, comprising the steps of:

determining a total amount of time in each time period;
   determining a total amount of unselected time within the unselected time portions of each time period;
   determining a cost range or limit applicable to the time periods;
   calculating an inventory utilization index ratio for each time period in the inventory based upon the total amount of time in each time period divided by the total amount of unselected time portions remaining in each time period;
   generating a table of time periods for time periods in the inventory, ranked numerically by the inventory utilization index ratio for each time period and including only time periods within the selected cost range or limit;
   selecting one or more time periods remaining in the table of time periods such that, other criteria being equal, a time period with the lowest inventory utilization ratio is selected; and
   storing the selected time periods as containing additional selected time in the time period inventory.

14. A computer-implemented system for selecting one or more of an inventory of available time periods, each time period or portion thereof having a cost associated therewith, comprising:

(a) means for determining a total amount of time in each time period;
   (b) means for determining a total amount of unselected time remaining in each time period;
   (c) means for calculating an inventory utilization index ratio for each time period as the total amount of time in each time period divided by total amount of unselected time remaining in each time period;
   (d) means for preparing a table of time periods ranked numerically by the inventory utilization index ratios;
   (e) means for determining a cost range or limit applicable to the time periods;
   (f) means for limiting the table to time periods which are within the specified cost range or limit;
   (g) means for selecting one or more time periods from the table; and
   (h) means for storing the selected time periods as containing additional selected time in the time period inventory.

15. The system of claim 12, wherein the storing means comprises a computer file storage medium.

16. The system of claim 15, wherein the means (a) to (g) further comprises a software program which performs the recited functions.

* * * * *